United States Patent

[11] 3,621,305

[72] Inventor George H. Jones
3557 Grant Ave., Ogden, Utah 84403
[21] Appl. No. 810,686
[22] Filed Mar. 26, 1969
[45] Patented Nov. 16, 1971

[54] SOLID-STATE, ELECTRONIC TIMER
19 Claims, 5 Drawing Figs.

[52] U.S. Cl. .................................................. 307/293,
307/252 M
[51] Int. Cl. ......................................................H03k 17/26,
H03k 17/28
[50] Field of Search........................................... 307/293,
252, 50, 33, 55

[56] References Cited
UNITED STATES PATENTS
3,201,756 8/1965 Young.......................... 307/293 X
3,222,577 12/1965 Kennedy ..................... 307/252 X
3,309,535 3/1967 Sutherland et al............ 307/252 X Primary Examiner—Donald D. Forrer
Assistant Examiner—John Zazworsky
Attorneys—Mallinckrodt & Mallinckrodt, P. H. Mallinckrodt and Philip A. Mallinckrodt ABSTRACT: A portable, solid-state on-off sequence, electronic timer particularly useful for but not limited to the control of motion picture cameras. This timer includes a time-delay circuit interconnected with a multivibrator circuit for providing time-delay control, a control circuit for the camera or other device being controlled, and an oscillator circuit for timing duration of operation of each camera or other device. This combination provides much greater flexibility of control than has heretofore been available in equipment of comparable size and cost. The multivibrator and oscillator circuits are conventional in and of themselves, only minor modifications being required to make them function properly in the timer of the invention.

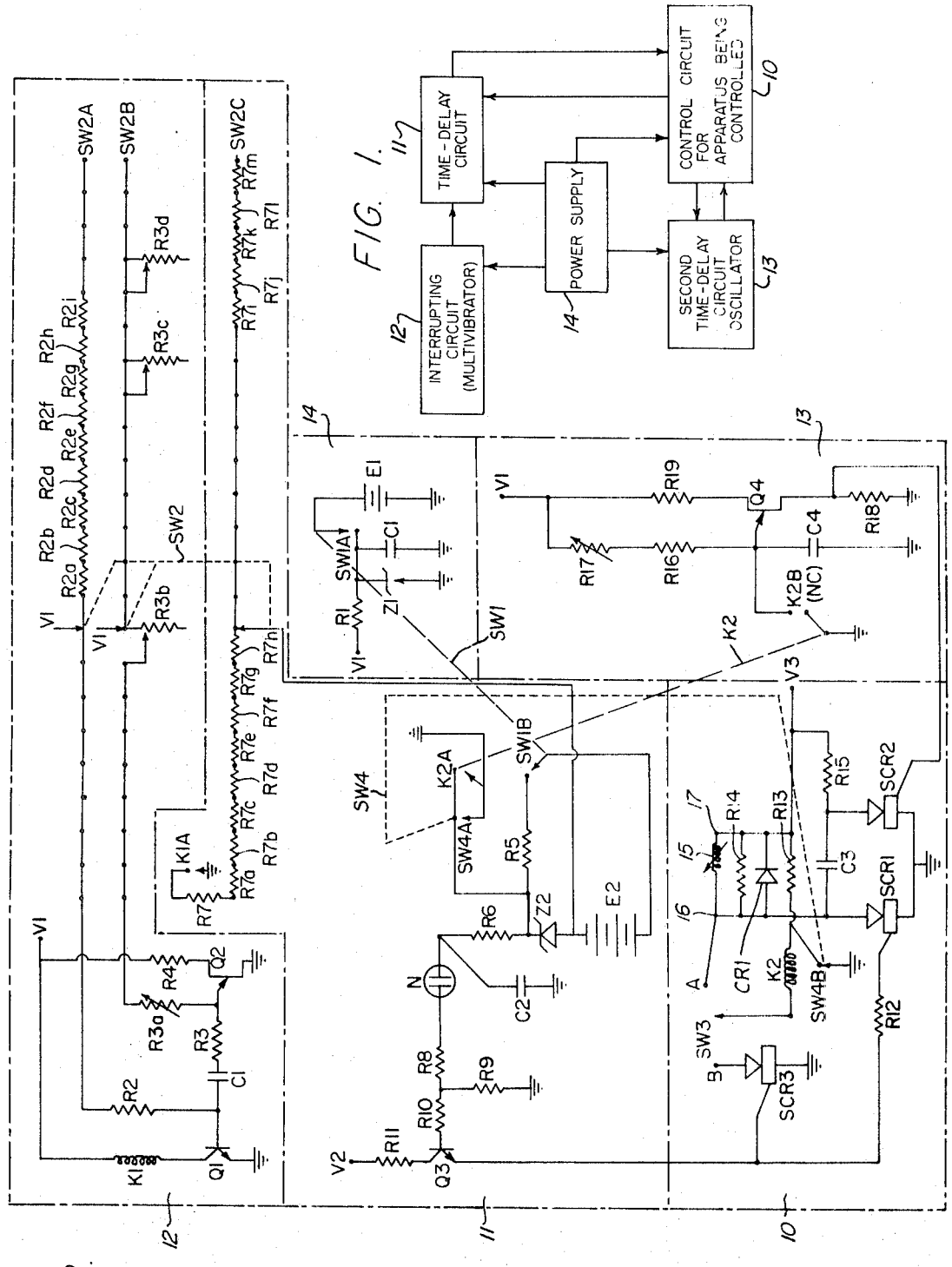

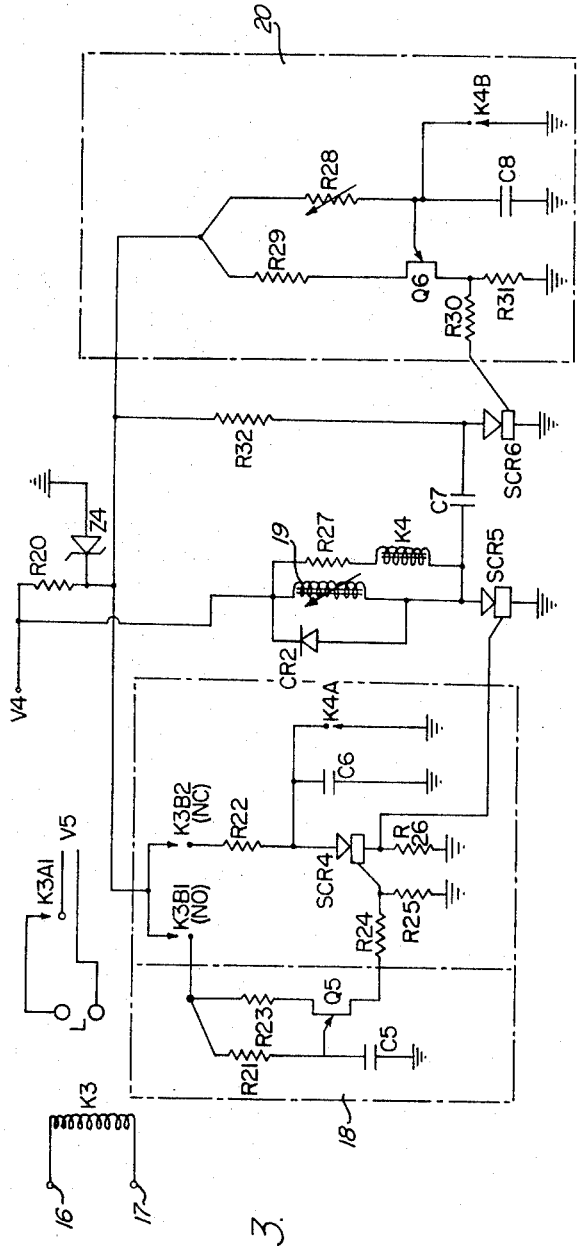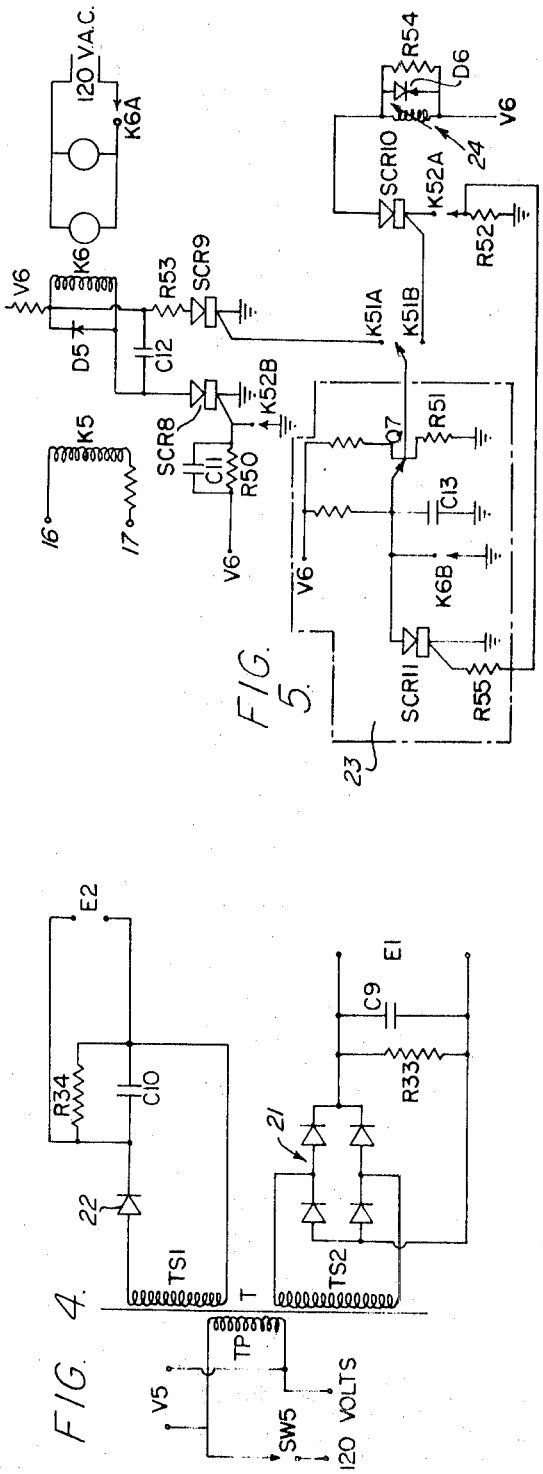

SOLID-STATE, ELECTRONIC TIMER

SUMMARY OF THE INVENTION

The timer of this invention may be set to turn on the apparatus or device being controlled, e.g., a motion-picture camera, at preselected time-delay intervals, ranging from as short as a second or less to as long as an hour or more, for preselected operation intervals which may range from a fraction of a second to a minute or more. Usually, the timer control is set to repeatedly turn the apparatus or device being controlled on and off automatically. Thus, a camera operator, for example, may select a short time-delay interval and a short operation interval for time-lapse photography of rapidly moving phenomena, such as moving clouds; a long time-delay interval and a short operation interval for time-lapse photography of slow-moving phenomena, such as a growing plant; or a long time-delay interval and a long operation interval for filming movie sequences, such as a bird building a nest. The timer may also be set for "single-run" operation, according to which the camera will run for a preselected operation interval after a preselected delay but will not repeat the sequence. Thus, a camera operator may select a time-delay interval of sufficient duration to position himself within the field of the camera lens for self-photography.

The wide selection of time-delay intervals offered by the timer of the invention are made possible by the overall combination of first and second time-delay circuits, interrupting circuit for one of the time-delay circuits, and interconnected control circuit for controlling the device or apparatus to be operated on a timed basis. In a preferred form of the timer adapted particularly for controlling a motion picture camera, the one time-delay circuit is connected through relay points to a multivibrator circuit, constituting the interrupting circuit. Such multivibrator is preferably constructed with variable pulse frequency and pulse width characteristics. In general, the one time-delay circuit comprises a charging circuit, including variable resistance, a source voltage, and a capacitor, connected in series through the relay points to provide a variable time constant. A voltage-triggered conducting device with a relatively high triggering voltage, such as a neon tube, is connected in parallel with the capacitor. During each pulse of the multivibrator, the relay points remain closed and the capacitor is charged a fraction of the total charge required to fire the neon tube. The magnitude of this fraction is determined by the pulse width and frequency of the multivibrator and the time constant of the charging circuit, which is adjustable by the aforesaid variable resistance.

Firing of the neon tube triggers a power-supply-controlling transistor into conduction, which simultaneously energizes the camera and a control relay for a camera shut-off oscillator, through the triggering of a silicon controlled rectifier (SCR). The oscillator constitutes the second time-delay circuit and determines the length of time the camera remains energized, the time period being adjustable by a potentiometer connected in series with a capacitor in the oscillator circuit.

A control circuit utilizing silicon controlled rectifiers (SCR) provides for automatic repetition of the aforedescribed cycle, and preferably includes means for insuring that the automatic repetition be at entirely uniform time intervals. It may also include means for "single-run" operation, whereby the oscillator turns off the camera without reactivating the charging circuit. In this latter instance, the repeating or single-run operation may be selected as desired by a simple switch.

The timer may be modified by the incorporation of additional similar circuits in cascade arrangement so that each discharge of the neon tube in the initial timer circuit results in sequentially energizing a plurality of devices or apparatus. For example, the discharging neon tube may trigger the simultaneous turning on of a lighting circuit and an additional timer circuit cascaded with respect to the initial one and having a short delay interval, e.g., a second or less. This additional timer circuit will then energize a camera and a second camera shutoff oscillator shortly after the lights have turned on. This second oscillator provided by the second, i.e., additional timer circuit, may be arranged to turn off the camera and the lights simultaneously, or the lights may be turned off later by the oscillator of the initial, e.g., first timer circuit, when it deenergizes the entire second timer circuit. The second timer circuit is preferably a separate portable unit that plugs into a unit made up of the first timer circuit.

The timer of this invention may be constructed of readily available components in a size and weight to make it conveniently portable, or, as just indicated, it may be made as multiple units for plug-in interconnection. It may be designed to be battery powered or to be powered by plug-in connection with standard utility power.

DESCRIPTION OF THE DRAWINGS

In the drawings, which illustrate specific forms of the electronic timer presently contemplated as the best mode of carrying out the invention:

FIG. 1 is a block diagram representative of the combined component circuits making up a single timer unit;

FIG. 2, a wiring diagram of one form of the combined circuits of FIG. 1 especially adapted for controlling the operation of a movie camera;

FIG. 3, a wiring diagram of a second timer unit circuit adapted to be plugged into the timer unit of FIGS. 1 and 2 to provide multiple, cascaded timer circuitry;

FIG. 4, a wiring diagram of a power unit adapted to replace the batteries in the circuitry of FIG. 2; and FIG. 5, a wiring diagram of circuitry for automatically controlling camera and photoflood lights.

DETAILED DESCRIPTION OF THE ILLUSTRATED EMBODIMENTS

As illustrated in FIG. 1, the electronic timer of the invention comprises a control circuit 10 having actuating components adapted to be directly connected to a device or apparatus whose operation is to be controlled; a time-delay circuit 11 for controlling the control circuit 10, an interrupting circuit in the form of a multivibrator circuit 12 for controlling the time-delay circuit 11, a second time-delay circuit in the form of an oscillator circuit 13 for shutting off operation of the device or apparatus, and a power supply 14.

The timer circuitry shown generally in FIG. 1 is shown specifically in FIG. 2 with respect to the control of a motion-picture camera. As there illustrated, the camera control circuit 10 includes a solenoid 15 adapted to be connected directly to the on-off control member of a motionpicture camera (not shown). This solenoid is electronically connected in circuit with other components to be described such that when a pulse is received from the time-delay circuit 11 the solenoid is actuated and remains actuated until a pulse is received from the shut-off oscillator 13.

The detailed circuitry of FIG. 2 will be described chronologically from the standpoint of operation of the entire system.

When double pole single throw switch SW1, controlling flow of power from power supply 14 to the system, is closed, one pole SW1A connects a power source E1 in parallel with a capacitor C1 and a zener diode Z1 through a resistor R1 to provide a preselected constant voltage V1, the circuits 12 and 13. Such power source E1 may be a battery, as indicated in FIG. 2, or it may be the circuitry shown in FIG. 4 taking power from a standard 120 volt line, as indicated. In any event, the output voltage V1 is selected on the basis of the design requirements of the multivibrator circuit 12.

The other pole SW1B of switch SW1 is connected in series with a second power source E2 in time-delay circuit 11. Although both poles of the switch close simultaneously, the pole SW1B is prevented from completing a circuit by the open relay pole K1A of a single pole single throw relay K1 of multivibrator circuit 12 and by a reverse-biased zener diode Z2 interposed between the switch pole SW1B and the negative terminal of the power source E2. }

To establish a time-delay interval, a 3-wafer master switch SW2 is set in one of a plurality of possible positions. In the illustrated instance, the master switch SW2 is placed in one of 23 available positions. Wafer SW2A includes a plurality of resistors R2a, R2b, R2c, etc., all of which are connected in series with resistor R2 and capacitor C1 of the multivibrator 12 so that the time constant of the resulting RC circuit may be increased or decreased by repositioning master switch SW2. In this fashion the time intervals between pulses of the multivibrator may be increased or decreased as desired. Potentiometers R3b, R3c, and R3d are connected between selected terminals of switch wafer SW2B in series with potentiometer R3a and resistor R3 to determine the width or duration of the pulse emitted by the multivibrator. Transistor Q1 and unijunction Q2 are connected in conventional fashion so that relay K1 is alternately energized and deenergized as Q1 and Q2 are alternately turned on and off, respectively, resistor R4 acting as a load resistor limiting base 2 current in unijunction Q2.

During each pulse of the multivibrator, relay K1 closes time-delay circuit 11 so that current flows from power source E2 through the closed series circuit containing switch SW1B, resistors R5 and R6, capacitor C2, closed relay pole K1A and selected resistors R7, R7a, R7b, . . . etc., of switch wafer SW2C. The time constant of the circuit varies with the position of the master switch SW2 which determines the number of R7 resistors in the circuit. Thus, each pulse of the multivibrator results in charging capacitor C2 a selected fraction of the total voltage required to fire a voltage-triggered conducting device, e.g., a neon tube N, connected in parallel therewith. By properly positioning the master switch SW2, the total time required for the neon tube N to fire after switch SW1 is turned on can be varied from as little as a second to as much as an hour. When the neon tube fires, both the camera solenoid 15 and the oscillator 13 are activated.

The instant the neon tube discharges, thereby draining voltage from the capacitor C2, transistor Q3, which controls current flow from power source V2 to silicon controlled rectifiers SCR1 and SCR3 of control circuit 10, and SCR1 are triggered into conductance. Resistors R8 and R9 are voltage dividers while resistor R10 limits the current applied to the base of Q3, these three components providing a transistor-biasing network. The voltage V2 applied to the collector of transistor Q3 causes a pulse of current, limited by the resistor R11, to flow to the gates of SCR1 and SCR3.

SCR3 is provided for the purpose of enabling the timer to operate nonrepetitively. A single pole double throw selector-switch SW3 is provided to enable the operator to include or exclude SCR3 from the circuit. If excluded by throwing the switch to contact A, the timer repeats indefinitely, automatically.

When switch SW3 is placed in position A for automatic operation, the pulse conducted by Q3 travels through resistor R12 and triggers SCR1 so that current flows from a power source V3 through parallel-connected relay K2, camera-operating solenoid 15, resistor R14, and series connected resistor R15 and capacitor C3. Relay K2 is of double pole double throw type, with pole K2A normally open and pole K2B normally closed. When current flows through this relay, pole K2A is closed and pole K2B is opened. The power source E2 is grounded through the closed relay pole K2A, thereby discharging capacitor C2 and keeping it discharged to prevent firing of the neon tube N. Opening relay pole K2B activates the second time-delay circuit, i.e., the oscillator 13. Resistor R13 merely limits the current and voltage applied to relay K2.

Power from V3 energizes the camera solenoid 15 and charges the capacitor C3. Diode CR1 serves the conventional purpose of eliminating voltage spikes across SCR1.

In its rest position with relay pole K2B closed, the emitter of unijunction transistor Q4 is grounded and Q4 remains in a nonconductive state. Also in this position, capacitor C4 remains uncharged.

When relay K2 is energized, it opens relay pole K2B. The capacitor C4 now begins to build up a charge that increases exponentially toward the voltage V1, with a time constant determined by the values of C4 and the resistances R16 and R17. By varying the resistance R17, the time constant of the RC circuit can be made longer or shorter, e.g., from 1 second to 25 seconds.

The voltage on capacitor C4 will eventually build up to the value required to trigger the unijunction Q4 into its conductive state. At this time, current will flow through the transistor to ground, causing a voltage to develop across resistor R18. This voltage is then transmitted to the gate of a silicon controlled rectifier SCR2, causing it to be triggered into its conductive state.

Prior to the triggering of SCR2, a voltage has been building up on capacitor C3 oriented so that the positive side of the charged capacitor is connected to the anode of SCR2. When SCR2 fires, the charge across C3 is connected in parallel with SCR1, thereby commutating (shutting off) the current through SCR1.

When SCR1 shuts off, current ceases to flow through K2 and through the camera solenoid, thus stopping the camera. Relay K2 is deenergized closing pole K2B and opening pole K2A, thus stopping the oscillator 13 and activating the time-delay circuit 11.

These circuits will remain in this state until another pulse from time-delay circuit 11 is received by the gate of SCR1. When this occurs, SCR1 is triggered to again actuate the camera solenoid 15 and relay K2. At this time, the negative side of C3 is effectively grounded, through SCR1, thus placing the anode of SCR2 at a negative potential. C3 now recharges to a voltage V3. These cycles are repeated indefinitely until switch SW1 is opened to turn off the timer.

For one-time operation, switch SW3 is placed in its B position so that, when a pulse is received from time-delay circuit 11, both SCR1 and SCR3 are triggered. SCR1 acts as a switch, turning on the camera solenoid 15 as in the case of the automatic operation just described. With switch SW3 in this B position, however, SCR3 acts as the switch to energize relay K2, thereby activating oscillator 13. When Q4 fires and SCR2 is turned on, SCR1 is commutated but SCR3 is not. Thus, current flow from V3 through the camera solenoid 15 is stopped, but relay K2 remains energized. Power source E2 thus remains grounded through relay pole K2A until pushbutton switch SW4 is depressed. Relay K2 is deenergized so that the capacitor C2 may once again be charged by E2. The stop oscillator is simultaneously turned off by the closing of relay pole K2B. SCR3 is commutated, because no current flows through it inasmuch as SW4 is closed.

The timer circuitry illustrated by FIG. 3 is designed to operate flood lights in addition to a camera solenoid, and is intended for cascade connection with the timer circuitry of FIG. 2 at points 16 and 17. Although it is possible to incorporate such circuitry in a portable, battery powered unit, the illustrated embodiment is intended for use in conjunction with an auxiliary power circuit, such as that illustrated in FIG. 4.

With the timer circuitry of FIG. 3 connected to the initial timer circuitry of FIG. 2 at the points 16 and 17, when SCR1 of that initial or first timer circuit 10 is turned on, double pole double throw relay K3 of the cascaded timer circuitry is energized so that pole K3A1 turns on flood lights L. In the illustrated instance, power is supplied from the terminals V5 of the power unit shown in FIG. 4 to the terminus V5 of the timer circuitry of FIG. 3. At the same time, relay pole K3B1 closes to permit capacitor C5 of a first time-delay circuit 18 (oscillator) to charge according to the time constant established by resistors R20 and R21. Zener diode Z4 is provided for regulating the voltage at power source V4.

It should be noted that when relay K3 is unenergized prior to the time SCR1 is triggered, relay pole K3B2 is closed so that current flow from V4 is through R20 and R22 to charge capacitor C6, the discharge of C6 being blocked by a silicon controlled rectifier SCR4.

After capacitor C5 charges sufficiently, it triggers the unijunction transistor Q5 into conduction so that current flows from V4 through resistors R23 and R24 to the gate of SCR4, thereby turning SCR4 on. Resistors R24 and R25 divide the voltage of V4 to prevent the gate of SCR4 from receiving too much voltage. When SCR4 is triggered, capacitor C6 discharges through SCR4 causing a voltage drop across R26. This voltage triggers a second silicon controlled rectifier SCR5, so that current can flow from V4 to ground through parallel-connected camera solenoid 19, through series-connected resistor R27 and single pole double throw relay K4, and through series-connected resistor R20, resistor R32, and capacitor C7. Diode CR2 is provided in conventional manner to eliminate voltage spikes from solenoid 19.

At the same time as the camera solenoid 19 is energized, capacitor C7 begins to charge and relay K4 is energized. Relay pole K4A closes and discharges capacitor C6 to commutate SCR4. Relay pole K4B opens to start operation of a second time-delay circuit 20 (oscillator), by permitting capacitor C8 of such circuit 20 to charge.

Operation of the oscillator 20 is similar to that of the oscillator 13. Thus, the time the camera solenoid remains energized is controlled by variable resistance R28. When unijunction transistor Q6 is triggered, the current flowing therethrough is limited by resistor R29. Resistors R30 and R31 divide the voltage from Q6 so that a proper potential is delivered to trigger a third silicon controlled rectifier SCR6. Current then flows to ground through resistor R32 and SCR6, and capacitor C7 discharges, thereby commutating SCR5.

When SCR5 is turned off, relay K4 is deenergized so that capacitor C8 is again discharged, and capacitor C6 is again permitted to charge as soon as relay K3 is deenergized by the commutation of SCR1, FIG. 2. As mentioned hereinbefore, relay K3 is controlled by oscillator 13. Thus, in operation, the flood lights L are turned on prior to energization of the camera solenoid 19, by a time interval determined by the time-delay circuit 18 of the second timer circuitry of FIG. 3. The camera continues to operate for an interval determined by the oscillator 20 and then turns off. At a time interval after the lights are turned on, such time interval being determined by the oscillator 13, the entire lighting circuit is turned off. Thus, the lights may go off at the same time or after the camera is turned off, but not before, provided the time delay afforded by the combined oscillators 18 and 20 is not longer than that afforded by oscillator 13.

It should be realized that a time-delay circuit corresponding to the circuit 11 of FIG. 2 could be employed in place of oscillator 18 if desired, along with a suitable interrupting circuit such as the multivibrator 12.

The power supply unit illustrated by FIG. 4 is itself supplied with ordinary 120 volt utility power under the control of a switch SW5. The primary winding TP of transformer T is energized and two sets of secondary windings TS1 and TS2 are connected to a full wave rectifier bridge 21 and a half-wave rectifier 22, respectively, to produce power that replaces the batteries E1 and E2 in the circuitry of FIG. 2.

The timer circuitry illustrated in FIG. 5 is intended for cascade connection with the timer circuitry of FIG. 2 at points 16 and 17, and is designed to consecutively, first, activate a set of photoflood lights, second, activate a camera, third, deactivate the camera, and, finally, deactivate the photoflood lights.

With the timer circuitry of FIG. 5 connected to the initial timer circuitry of FIG. 2 at the points 16 and 17, when SCR1 of that initial or first timer circuitry is turned on, double pole double throw relay K5 of such cascaded timer circuitry of FIG. 5 is energized, so that relay pole K51A opens, K51B closes, K52A closes, and K52B opens.

Prior to the activation of relay K5, a voltage of V6 had been building up on capacitor C11, which forms a parallel circuit to ground with resistor R50 through previously closed relay pole K52B. When relay pole K52B opens, capacitor C11 begins to discharge through resistor R50 and produces a positive voltage on the gate of silicon controlled rectifier SCR8, which triggers SCR8 into conduction. When SCR8 is triggered, current flows from V6 through the coil of double pole double throw relay K6 to ground, thus energizing relay K6. Capacitor C12 now charges to the voltage V6, Diode D5 is provided to protect against any voltage spikes that might be produced by the coil of relay K6.

The activation of relay K6 closes relay pole K6A, which provides power to the photoflood lights, and opens relay pole K6B, which starts operation of timer circuit 23 (oscillator). Silicon controlled rectifier SCR9 is in its off state, so acts as an open circuit. The operation of oscillator 23 is similar to that of the oscillator 13 of FIG. 2. When the voltage on capacitor C13 builds up to the point necessary to fire unijunction transistor Q7, current flows through Q7 and produces a voltage drop across resistor R51. This is transmitted through closed relay pole K51B to the gate of another silicon controlled rectifier SCR10, causing it to trigger. The triggering of SCR10 causes current to flow through camera solenoid 24, thus activating the camera through SCR10 and a resistor R52 to ground. Diode D6 provides protection from any voltage spikes that may be produced by the camera solenoid 24. Voltage drop is produced across R52, which is transmitted to the gate of another silicon controlled rectifier SCR11, triggering SCR11. This in turn shorts out capacitor C13 and stops operation of oscillator 23. Resistor R55 acts to limit the current through the gate of SCR11.

The circuit now remains in this state, with both lights and camera operating, until the commutation of SCR1 in the initial or first timer circuitry of FIG. 2 deenergizes relay K5. With relay K5 deenergized, relay pole K51A closes, pole K51B opens, pole K52A opens, and pole K52B closes.

The opening of relay pole K52A commutates SCR10 and deenergizes camera solenoid 24. No voltage is produced across resistor R52, so no voltage is applied to the gate of SCR11. The current flowing through SCR11 is below the holding current value, so SCR11 commutates, thereby again putting into operation oscillator 23. Pulses from oscillator 23 are now directed through closed relay pole K51A to the gate of SCR11 and thus triggers SCR11. With SCR11 triggered, current flows from V6 through resistor R53 to ground. The current from capacitor C12 now causes the commutation of SCR8, which deenergizes relay K6. With relay K6 deenergized, pole K6A opens and turns off the photoflood lights and pole K6B closes, thereby shorting capacitor C13 in oscillator 23 to ground and stopping operation of the oscillator. The circuit will remain in this state, with both lights and camera off, until relay K5 is again energized by the initial timer circuitry of FIG. 2, whereupon the foregoing cycle is repeated.

Whereas this invention is here described and illustrated with respect to certain forms thereof, it is to be understood that many variations are possible.

I claim:

1. A solid-state, electronic timer, comprising electrically activated means for starting and stopping operation of apparatus to be controlled on a time basis;
   time-delay means for producing electrical signals at predetermined time intervals;
   means for interrupting the operation of said time-delay means at predetermined time intervals for time periods of predetermined duration;
   a second time-delay means for producing electrical signals at predetermined time intervals;
   a control circuit including two silicon controlled rectifiers and commutation means for activating and deactivating, respectively, said starting and stopping means in response to signals from the first and second time-delay means, respectively; and
   means for supplying electric power.

2. A solid-state, electronic timer in accordance with claim 1, wherein the first time-delay means comprises a source of power for triggering one of the silicon controlled rectifiers; and an electrical circuit having capacitance and resistance to provide a variable time constant, a transistor controlling the supply of said power, a voltage-triggered conducting device arranged to turn on said transistor, and capacitor-discharging means.

3. A solid-state, electronic timer in accordance with claim 2, wherein the electrical circuit has a capacitance connected in parallel with the voltage-triggered conducting device, a variable resistor in series with said capacitor, and a fixed resistor in series with said capacitor and located between said capacitor and said variable resistor.

4. A solid-state, electronic timer in accordance with claim 3, wherein there is additionally provided in the circuit a transistor bias network.

5. A solid-state, electronic timer in accordance with claim 3, wherein the voltage-triggered conducting device is a gas discharge tube.

6. A solid-state, electronic timer in accordance with claim 1, wherein the time-delay interrupting means is a multivibrator circuit.

7. A solid-state, electronic timer in accordance with claim 6, wherein the multivibrator circuit is constructed for varying pulse frequency and pulse width.

8. A solid-state, electronic timer in accordance with claim 1, wherein the second time-delay means is an oscillator circuit.

9. A solid-state, electronic timer in accordance with claim 8, wherein the oscillator circuit is constructed so that the frequency thereof can be varied.

10. A solid-state, electronic timer in accordance with claim 1, wherein the control circuit additionally includes means for starting and stopping operation of the first and the second time-delay means in alternate predetermined timed sequence, respectively.

11. A solid-state, electronic timer in accordance with claim 10, wherein the control circuit additionally includes a third silicon controlled rectifier arranged to operate the means for starting and stopping operation of the first and second time-delay means to prevent automatic repetition of the activating and deactivating cycles of the electronically activated means for starting and stopping operation of the apparatus controlled on a time basis.

12. A solid-state, electronic timer in accordance with claim 11, wherein the control circuit includes switch means for selectively including or excluding the third silicon controlled rectifier from operation.

13. A solid-state, electronic timer in accordance with claim 1, additionally including circuitry and means in cascaded arrangement with the main electronic timer circuitry defined by claim 1 for controlling additional apparatus, said cascaded circuitry and means for each additional apparatus including electrically activated means, first and second time-delay means, and a control circuit all as defined in claim 1.

14. A solid-state, electronic timer in accordance with claim 13, wherein both the first and second time-delay means of the cascaded circuitry are oscillator circuits.

15. A solid-state, electronic timer in accordance with claim 14, wherein the electrically activated means comprise electrically activated starting and stopping means for a photographic lighting system and for a motion-picture camera, respectively.

16. A solid-state, electronic timer in accordance with claim 13, wherein at least one of the cascaded circuitry and means comprise two separate starting and stopping means for two separate apparatus, respectively, to be controlled on a time basis; means for activating one of said starting and stopping means for a controlled period of time; and means for activating the other of said starting and stopping means for a period of time within the period of activation of the other of said starting and stopping means.

17. A solid-state, electronic timer in accordance with claim 16, wherein the two activating means share an oscillator in common and include control relay means connected in the main electronic timer circuitry.

18. A solid-state, electronic timer in accordance with claim 17, wherein the first-named activating means includes a starting silicon controlled rectifier and a stopping silicon controlled rectifier; and the other activating means includes switch means under the control of the oscillator for controlling said other starting and stopping means.

19. A solid-state, electronic timer, comprising
electrically activated means for starting and stopping operation of apparatus to be controlled on a time basis;
time-delay means for producing electrical signals at predetermined time-intervals;
a second time-delay means for producing electrical signals at predetermined time intervals;
a control circuit including two silicon controlled rectifiers and commutation means for activating and deactivating, respectively, said starting and stopping means in response to signals from the first and second time-delay means, respectively;
the first mentioned time-delay means comprising a source of power for triggering one of the silicon controlled rectifiers, and an electrical circuit having capacitance and resistance to provide a variable time constant, a transistor controlling the supply of said power, and a voltage-controlled conducting device arranged to turn on said transistor; and
means for supplying electric power.

* * * * *